US009848737B2

(12) United States Patent
Behar

(10) Patent No.: US 9,848,737 B2
(45) Date of Patent: Dec. 26, 2017

(54) APPLIANCE WITH RECESSED HANDLE AND COOLING AIR INLETS

(71) Applicant: Sunbeam Products, Inc., Boca Raton, FL (US)

(72) Inventor: Moises Behar, Boca Raton, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 130 days.

(21) Appl. No.: 14/923,036

(22) Filed: Oct. 26, 2015

(65) Prior Publication Data

US 2016/0113445 A1  Apr. 28, 2016

Related U.S. Application Data

(60) Provisional application No. 62/068,081, filed on Oct. 24, 2014.

(51) Int. Cl.
*A47J 43/046* (2006.01)
*A47J 43/07* (2006.01)
*F04D 29/58* (2006.01)

(52) U.S. Cl.
CPC ......... *A47J 43/0716* (2013.01); *A47J 43/046* (2013.01); *F04D 29/582* (2013.01)

(58) Field of Classification Search
CPC .................................................. A47J 43/046
USPC .................... 366/205, 314; 241/282.1, 282.2
See application file for complete search history.

(56) References Cited

U.S. PATENT DOCUMENTS

| 2,225,250 A | 12/1940 | Rodwick |
| 2,284,155 A * | 5/1942 | Landgraf .............. A47J 43/046 200/61.58 R |
| 3,575,524 A * | 4/1971 | Adajian ................... F01P 5/06 310/62 |
| 4,681,030 A | 7/1987 | Herbert |
| 4,922,464 A | 5/1990 | Kamprath |
| 5,273,358 A | 12/1993 | Byrne et al. |
| D345,079 S | 3/1994 | Johnson |
| D457,380 S | 5/2002 | Mauch |
| 7,422,362 B2 | 9/2008 | Sands |
| D631,282 S | 1/2011 | Ferraby |
| 8,752,481 B2 | 6/2014 | Williams et al. |
| 2007/0133347 A1 | 6/2007 | Mok et al. |
| 2010/0020633 A1 | 1/2010 | Dickson, Jr. |

* cited by examiner

*Primary Examiner* — David Sorkin
(74) *Attorney, Agent, or Firm* — Seth Blum

(57) ABSTRACT

There is provided an appliance including a base having a housing, a motor-fan assembly disposed in the housing, a working implement which is operated by the motor-fan assembly when energized, a pocket integrally formed in a sidewall of the housing configured for use as a carrying handle, and one or more apertures formed in the pocket configured to allow cooling air to enter the housing to cool the motor-fan assembly.

9 Claims, 5 Drawing Sheets

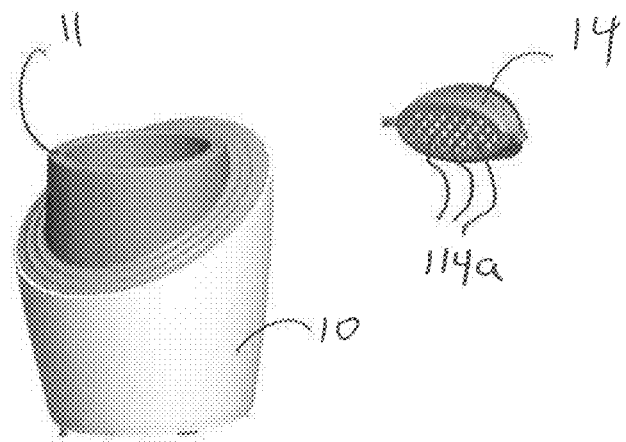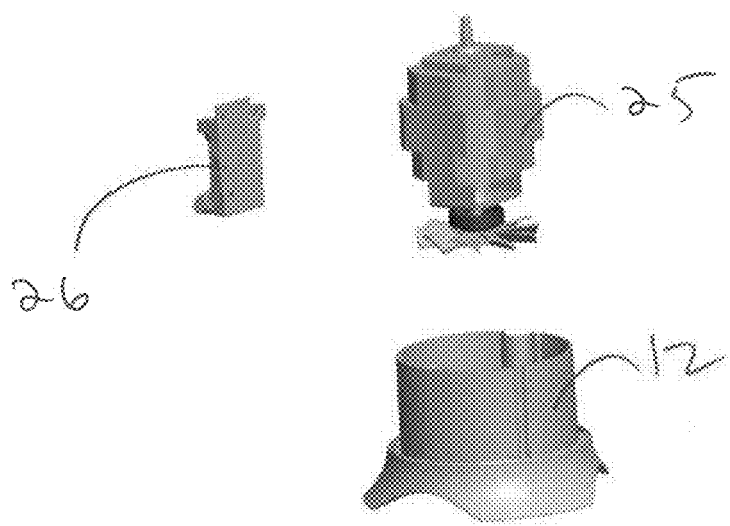
Fig. 2

APPLIANCE WITH RECESSED HANDLE AND COOLING AIR INLETS

RELATED APPLICATIONS

This application claims the benefit of U.S. provisional patent application Ser. No. 62/068,081 filed on Oct. 24, 2015.

FIELD OF THE INVENTION

The invention relates to appliances and more particularly to an appliance with an integrally formed handle in the housing with inlets for cooling air to cool the motor-fan assembly.

BACKGROUND OF THE INVENTION

Appliances such as blending appliances are known in the art. Typically, such appliances include a housing containing a motor-fan assembly and a working implement operated by the motor-fan assembly. The housing may be provided with cooling air inlets for directing cooling air to the motor-fan assembly before being directed to heated air outlets. Due to the limited amount of space available for appliances of this type with smaller footprints, it isn't possible to include the cooling air inlets and the heated air outlets on the bottom of the housing. In addition, having one of the cooling air inlets or the heated air outlets on a sidewall of the housing is unsightly.

SUMMARY OF THE INVENTION

In an embodiment, there is provided an appliance including a base having a housing, a motor-fan assembly disposed in the housing, a working implement which is operated by the motor-fan assembly when energized, a pocket integrally formed in a sidewall of the housing configured for use as a carrying handle, and ne or more apertures formed in the pocket configured to allow cooling air to enter the housing to cool the motor-fan assembly.

In an embodiment, there is provided a blending appliance including a housing configured to removably receive a blending container, a motor-fan assembly disposed in the housing, an agitator disposed in the blending container which is rotated by the motor when energized, a recess integrally formed in a sidewall of the housing configured for use as a carrying handle, and one or more inlets formed in the recess configured to allow cooling air to enter the housing.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 1 is a front perspective view of an embodiment of a blending appliance;

DETAILED DESCRIPTION OF THE INVENTION

An appliance having a motorized base including food preparation or other appliances such as those for blending, food processing, or juicing. The motorized base includes a recessed handle in the sidewall having a plurality of cooling air inlets for cooling the motor-fan assembly as described below.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention.

Figure 2:
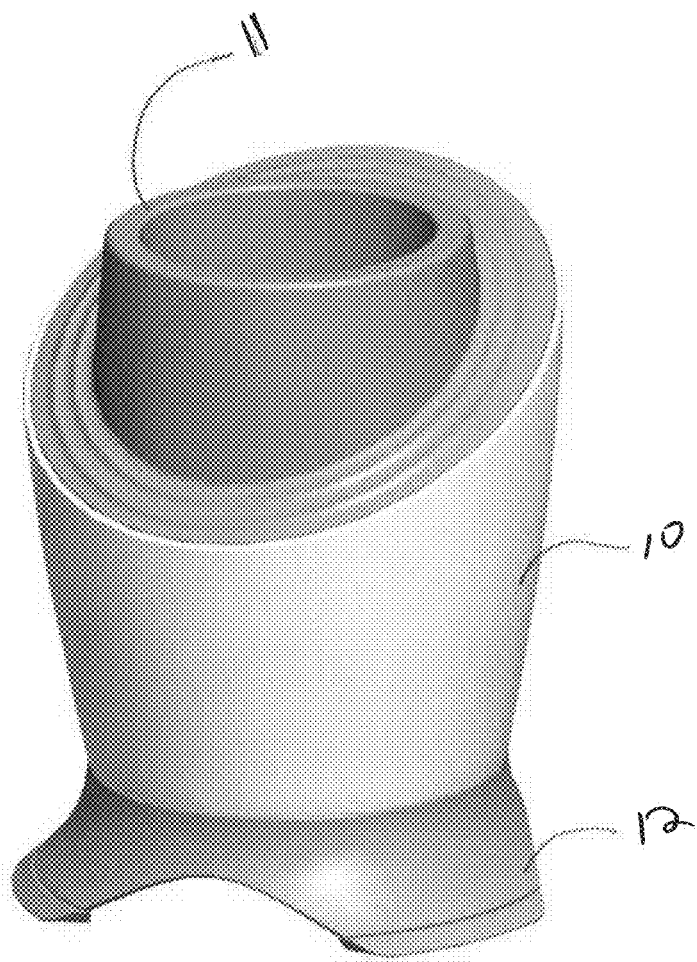
FIG. 2 is an exploded perspective view thereof.
Figure 3:
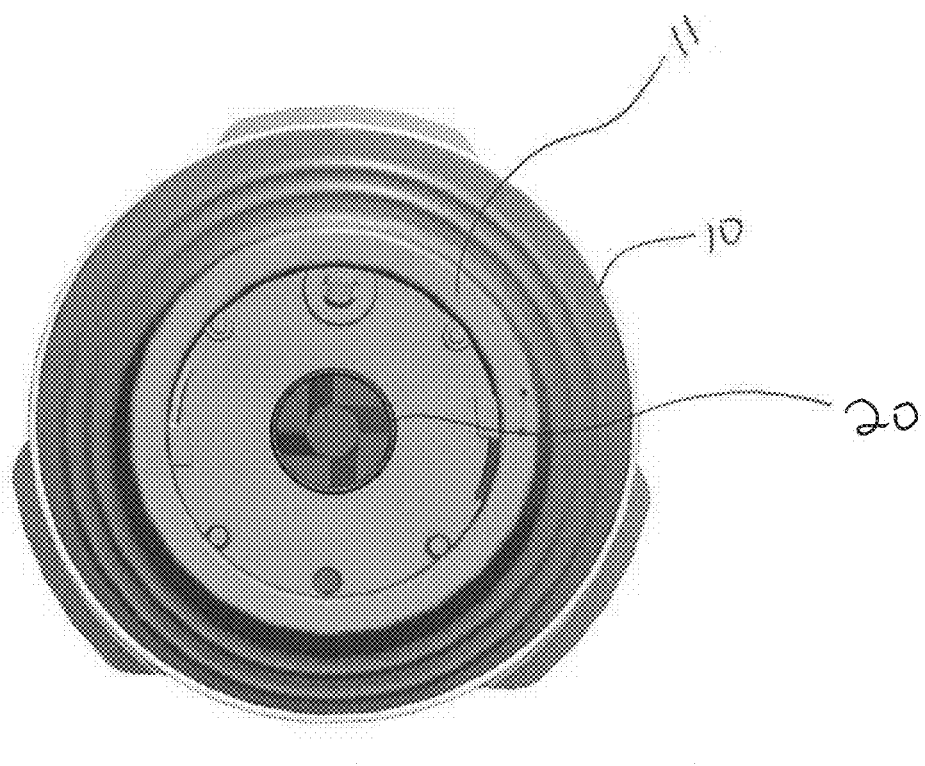
FIG. 3 is a top view thereof.

Referring now to FIGS. 1-3 there is illustrated a motorized base 100 for an appliance including but not limited to a blending appliance for blending beverages. Other examples of such included appliances are food processors, mixers, juicers or any other appliance having a housing with a motor-fan assembly powering a working implement. In an embodiment, the base 100 includes a housing 10 containing a motor-fan assembly 25 for providing rotary power to an agitator (not shown) in a blending container (not shown) when the blending container (not shown) is seated on the housing 10. The agitator (not shown) is secured to the bottom of the blending container (not shown) with an agitator collar (not shown). The housing 10 includes an attachment protrusion 11 for receiving the agitator collar (not shown) of the blending container (not shown). The attachment protrusion 11 also aligns the agitator coupler (not shown) on the bottom of the agitator (not shown) with the rotary coupler 20 of the motor-fan assembly 25 protruding from the housing 10 into the attachment protrusion 11. One or more electronic controls (not shown) may be connected to an electronic control system 26 contained within the housing 10 for controlling the motor-fan assembly 25 in a known manner using manual or pre-programmed operating routines.

Figure 4:
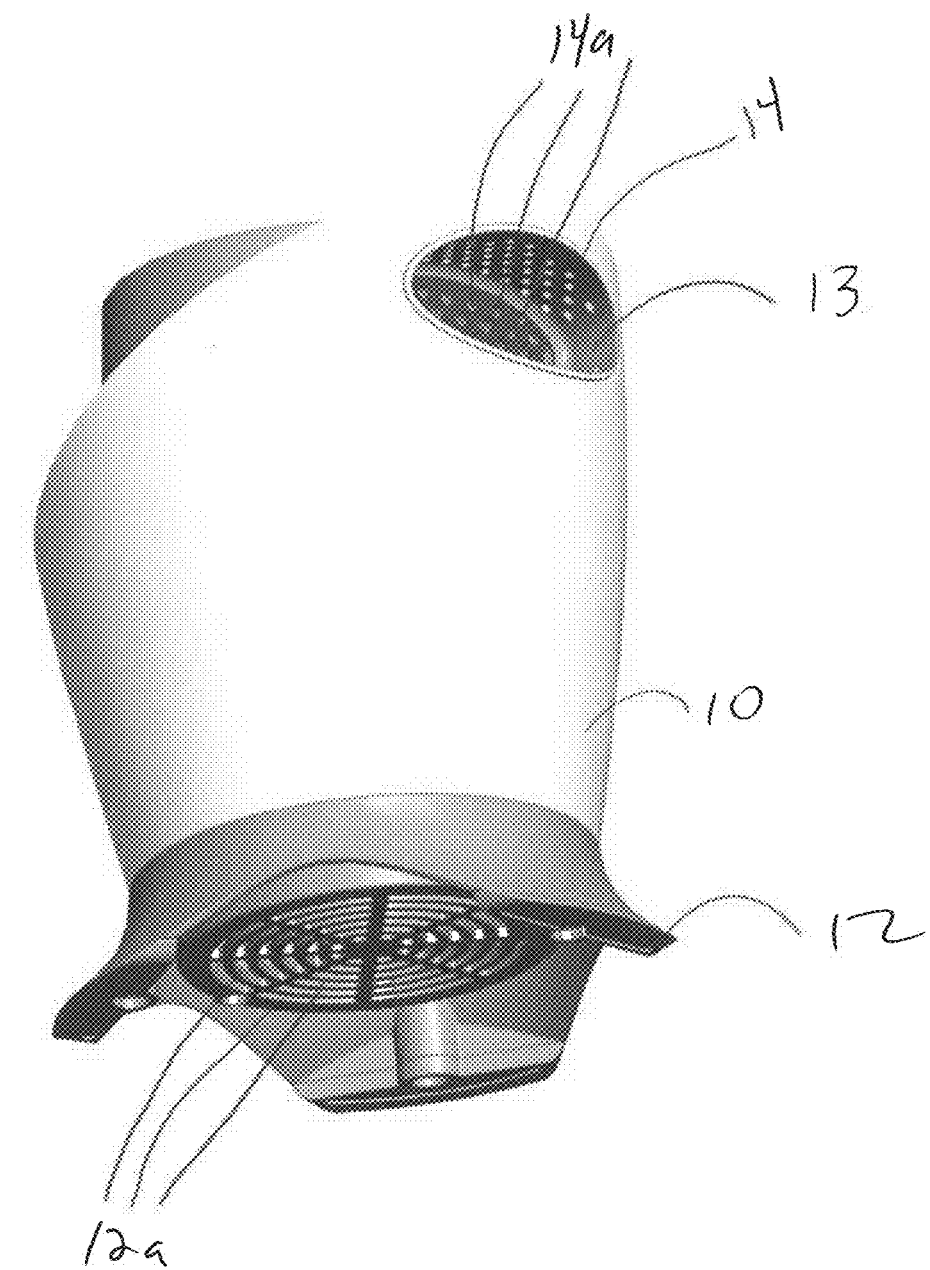
FIG. 4 is a rear elevated view thereof.
Figure 5:
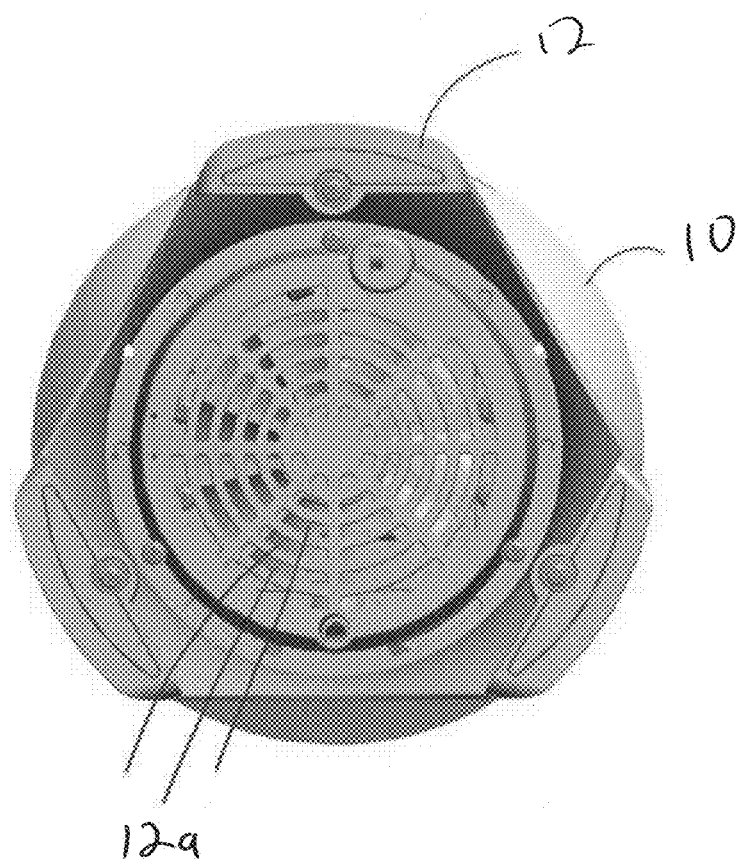
FIG. 5 is a bottom view thereof.

Referring now also to FIGS. 4-5, at the rear of the housing 10 is a recess or pocket 13 formed in the sidewall of the housing 10 adapted for use as a carrying handle. A cover 14 is fitted into the recess 13 having a plurality of apertures 14a formed therein for use as air inlets into the interior of the housing 10. As the motor-fan assembly 25 is rotated, air is drawn into the housing 10 through the apertures 14a and drawn past the motor-fan assembly 25. The motor-fan assembly 25 directs the air to a plurality of heated air outlets 12a formed in the base 12 of the housing 10. As the air is drawn past the motor-fan assembly 25, heat generated by the motor-fan assembly 25 is absorbed and the heated air is directed to the plurality of heated air outlets 12a to be discharged into the atmosphere. In an embodiment, the plurality of heated air outlets 12a are slot-shaped arcs. The incorporation of the plurality of apertures 14a into the cover 14 of the recess 13 is done because of the limited amount of space available in the base 12 for both the plurality of heated air outlets 12a and the plurality of apertures 14a for the inlet of cooling air. This further allows for minimizing the unsightly appearance of the plurality of apertures 14a in the sidewall of the housing 10 and minimizing the footprint of base 12.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A base for an appliance, comprising:
   a housing including a surrounding sidewall;
   a motor-fan assembly disposed in the housing;
   a working implement which is operated by the motor-fan assembly when energized;
   a recessed portion extending through the sidewall of the housing configured for use as a carrying handle; and
   one or more air inlets formed in the recessed portion configured to allow cooling air to enter the housing to cool the motor-fan assembly.

2. The base of claim 1, further including a cover fitted into the recessed portion having the one or more air inlets formed therein.

3. The base of claim 1, the housing further including a base having one or more outlets formed therein for discharging heated air from within the housing.

4. The base of claim 3, wherein the one or more outlets are slot shaped.

5. The base of claim 1, wherein the working implement is an agitator.

6. A food preparation appliance, comprising:
   a housing including a surrounding sidewall and configured to removably receive a blending container;
   a motor-fan assembly disposed in the housing;
   an impeller disposed in the blending container which is rotated by the motor when energized;
   a recessed portion extending through the sidewall of the housing configured for use as a carrying handle; and
   one or more inlets formed in the recessed portion configured to allow cooling air to enter the housing.

7. The appliance of claim 6, further including a cover fitted into the recessed portion having the one or more inlets formed therein.

8. The appliance of claim 6, the housing further including a base having one or more outlets formed therein for discharging heated air from within the housing.

9. The appliance of claim 8, wherein the one or more outlets are slot shaped.

* * * * *